US012763041B2

(12) United States Patent
Vandanov et al.

(10) Patent No.: US 12,763,041 B2
(45) Date of Patent: Oct. 13, 2026

(54) LOW LATENCY SYNCHRONIZATION OF VIDEO RENDERING PIPELINES WITH HIGH REFRESH RATES

(71) Applicant: NVIDIA Corporation, Santa Clara, CA (US)

(72) Inventors: Viktor Grigoryevich Vandanov, San Jose, CA (US); Rouslan Lyubomirov Dimitrov, Santa Clara, CA (US); Seth Schneider, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 18/373,748

(22) Filed: Sep. 27, 2023

(65) Prior Publication Data

US 2025/0104670 A1 Mar. 27, 2025

(51) Int. Cl.
*G09G 5/395* (2006.01)

(52) U.S. Cl.
CPC ..... *G09G 5/395* (2013.01); *G09G 2340/0435* (2013.01)

(58) Field of Classification Search
CPC ........... G09G 5/395; G09G 2340/0435; G09G 5/006; G09G 5/363
See application file for complete search history.

(56) References Cited

U.S. PATENT DOCUMENTS

| | | | | |
|---|---|---|---|---|
| 11,748,298 | B2 * | 9/2023 | Koker | G06F 9/3004 345/519 |
| 12,036,471 | B2 | 7/2024 | Yong et al. | |
| 2009/0305790 | A1 | 12/2009 | Lu et al. | |
| 2010/0166065 | A1 | 7/2010 | Perlman et al. | |
| 2013/0123004 | A1 | 5/2013 | Kruglick | |
| 2016/0155399 | A1 * | 6/2016 | Tripathi | G06T 1/20 345/506 |
| 2017/0213312 | A1 | 7/2017 | Woo et al. | |
| 2017/0263201 | A1 * | 9/2017 | Sato | G09G 3/3648 |
| 2019/0042177 | A1 * | 2/2019 | Tanner | G06F 3/1454 |
| 2019/0358541 | A1 | 11/2019 | Bronder et al. | |
| 2021/0093960 | A1 | 4/2021 | Cerny et al. | |
| 2021/0217270 | A1 | 7/2021 | Brown et al. | |
| 2021/0377623 | A1 | 12/2021 | Larson et al. | |
| 2022/0084481 | A1 * | 3/2022 | Manepalli | G09G 5/001 |
| 2023/0134189 | A1 * | 5/2023 | Xu | A63F 13/25 463/31 |
| 2023/0154100 | A1 | 5/2023 | Perry et al. | |
| 2023/0197037 | A1 * | 6/2023 | Ranka | G09G 5/12 345/520 |

(Continued)

*Primary Examiner* — Xiao M Wu
*Assistant Examiner* — George Renze
(74) *Attorney, Agent, or Firm* — Lowenstein Sandler LLP

(57) ABSTRACT

Disclosed are apparatuses, systems, and techniques that reduce latency of frame processing pipelines. The techniques include but are not limited to causing a display to set a refresh rate that matches a frame rendering rate of an application and rendering, with the frame rendering rate, a plurality of frames. Rendering frames includes generating, using a first processing unit, sets of instructions associated with respective frames and generated starting at times spaced with the refresh rate, processing, using a second processing unit, the sets of instructions to render the frames, and causing the display to display the rendered frames.

19 Claims, 6 Drawing Sheets

(56) References Cited

U.S. PATENT DOCUMENTS

| | | | | |
|---|---|---|---|---|
| 2023/0222992 | A1* | 7/2023 | Zhang | G09G 5/18 345/204 |
| 2023/0262281 | A1* | 8/2023 | Kasichainula | H04N 21/8547 386/207 |
| 2024/0342600 | A1 | 10/2024 | Li et al. | |

* cited by examiner

LOW LATENCY SYNCHRONIZATION OF VIDEO RENDERING PIPELINES WITH HIGH REFRESH RATES

TECHNICAL FIELD

At least one embodiment pertains to processing resources and techniques that are used to improve efficiency and decrease latency of data transfers in computational applications. For example, at least one embodiment pertains to efficient transfer of image and video data between computing devices in latency-sensitive applications, including streaming applications, such as video games.

BACKGROUND

Modern gaming or streaming applications generate (render) a large number of frames within a short time, such as 60 frames per second (fps), 120 fps, or even more. The rendered frames are displayed on a screen (monitor) of a user's computer, which can be connected to the gaming application via a local bus or a network connection (e.g., in the instance of cloud-based applications). High frame rates, when matched by a refresh rate of the monitor, can ensure an immersion illusion and lead to a deeply enjoyable gaming experience. Frames rendered by a gaming processor, however, have varying complexities, degree of similarity to other frames, and/or the like. As a result, the time used to render different frames may vary significantly. When displayed at high rates, this can result in various visual artifacts, such as frame tears and stutters, which can ruin or significantly reduce the enjoyment of the game. A frame tear occurs when a new frame has been rendered and sent to the screen too early, so that a (top) portion of the screen displays the new frame while the rest of the screen still displays a previous frame. A stutter occurs when a new frame is rendered too late, so that a previously rendered frame has to be displayed instead, thus causing the gamer to momentarily experience a frame redundantly. Frames that are not timely displayed can clog a frame processing pipeline, increase latency, and further reduce the gaming or streaming experience.

DETAILED DESCRIPTION

Figure 1:
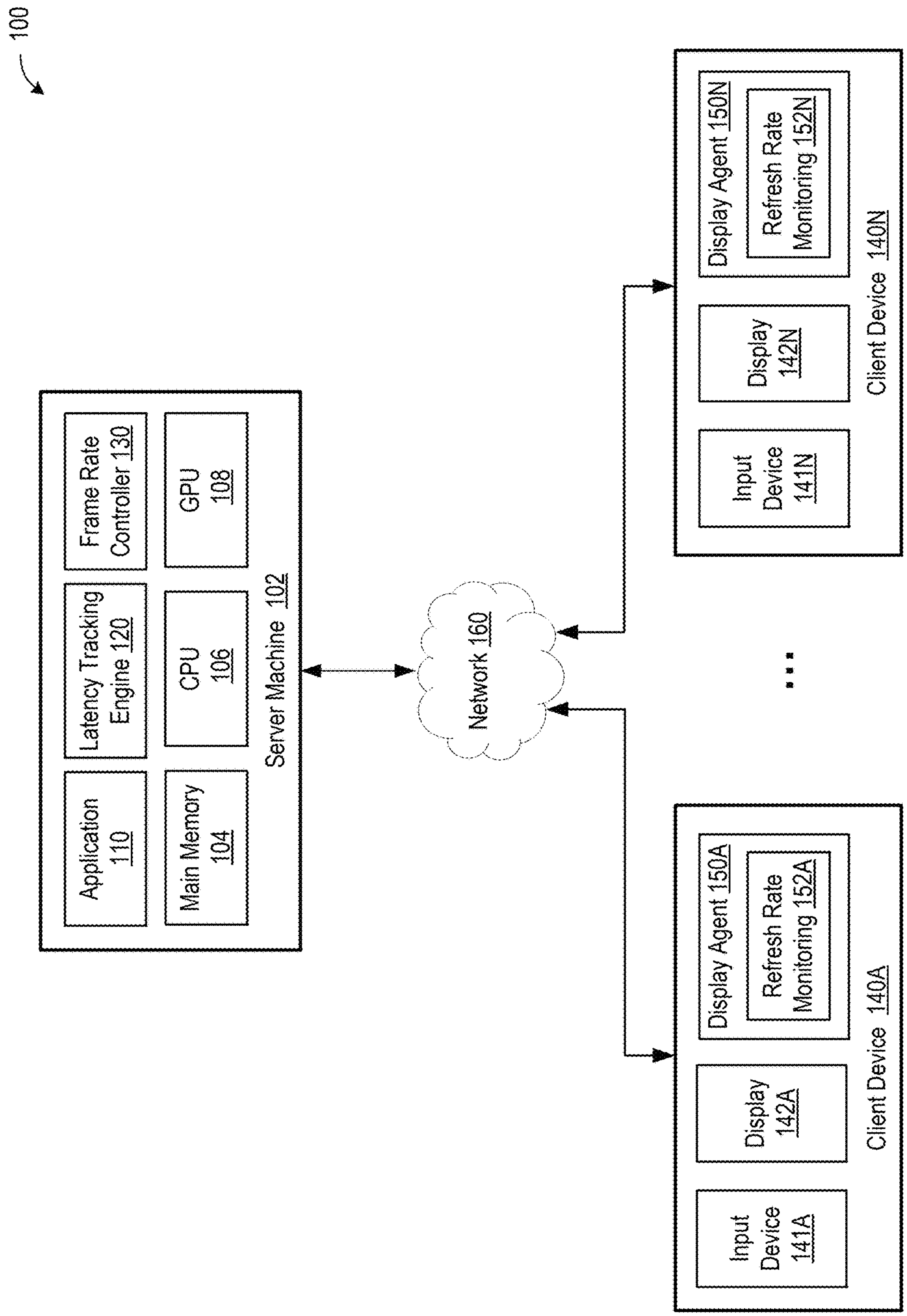
FIG. 1 is a block diagram of an example system capable of reducing latency by optimizing one or more latency-inducing stages of a frame processing pipeline that supports operations of a latency-sensitive application, according to at least one embodiment.

Reducing latency—defined as the time that passes between a user's input (e.g., clicking a button, changing a viewpoint, making a turn, or firing a weapon, e.g., by clicking a mouse) and a change on a display that reflects this input—is a major challenge in gaming (and other interactive streaming) applications. In particular, specialized publications and reviews of gaming applications regularly report on measured displayed frame rates and/or latency for various available hardware and software platforms. With cloud-based systems gaining in popularity, reducing latency becomes even more important. Many users remain skeptical about the ability of cloud computing services to ensure an adequate user experience comparable to the experience enabled by local computing machines and tend to ascribe noticed latency to network transmission delays. In many instances, such skepticism is unfounded as the latency is dominated by the delays occurring during processing (image or frame rendering, encoding, etc.) on a gaming server and queueing and presenting images/frames on the local user's computer.

In particular, a typical gaming (or any other streaming) pipeline operates with a gaming application rendering frames at a native—to the game—pace at one end of the pipeline, and a local screen (display) presenting the rendered frames at the other end of the pipeline. The refresh rate of the display (e.g., 60 Hz) can be different from a frame rendering rate of the application (e.g., 180 frames per second). If the application renders frames at a higher rate than the refresh rate of the display, the display is not capable of presenting all rendered frames. As a result, a selection (sampling) of rendered frames is typically performed on the server side, e.g., prior to encoding the frames and packetizing the frames for network transmission. Sampling—and encoding and packetizing—however, requires that a processor, e.g., a central processing unit (CPU), generates a series of instructions (commands) to support and coordinate such operations, which increases latency.

Furthermore, frame rendering is typically a two-step process where the CPU processes user inputs, updates the current state of the game, and generates rendering commands to the GPU, e.g., particular distances traveled by specific game objects, angles to which the objects have turned, and/or like. A graphics processing unit (GPU) then renders this content (e.g., by rasterizing and shading pixels) and places the rendered frame into a frame queue. Normally, this rendering by the GPU creates the pipeline bottleneck with the CPU maintaining a queue of instructions for the GPU to process. The CPU can also keep track of frames that take too long to render and eliminate instructions to generate such late frames that are no longer relevant. Such instructions waiting in the queue to be processed is another contributor to the latency. Additionally, multiple frames can be maintained on the client computer in a de-jitter buffer to smooth out fluctuations in the network throughput, e.g., to store partially delivered frames while different packets of the frames are being transmitted (or retransmitted, in the instances of lost packets) over the network, and so on. All such stages and elements of the frame processing pipeline introduce additional latency that is detrimental to the performance of the application.

Aspects and embodiments of the instant disclosure address these and other technological challenges by providing for methods and systems that decrease processing times in latency-sensitive streaming applications (including but not limited to gaming applications) by eliminating and optimizing latency-inducing stages of a frame processing pipeline. More specifically, a latency tracking engine (LTE) may track various metrics representative of temporal dynamics of various processes occurring in the frame processing pipeline, e.g., a time delay between a user input (a mouse click or a game console input) and the resulting change of the displayed picture, a time between the start of CPU and/or GPU processing of a given frame and presentation of that frame on the client display, and/or the like. The tracked metrics enable bringing various stages of the pipeline in lockstep with each other.

In some embodiments, the client display may be a variable refresh rate display that can update the screen when a new frame is received rather than presenting new frames at a fixed refresh rate. In some embodiments, the frame refresh rate may be set to 240 Hz. In those instances where the display has a rate that is different from 240 Hz (e.g., 239.9 Hz instead of 240.0), the LTE may detect this difference and frame pace the application to render video frames at that specific, to the display, rate (e.g., 239.9 Hz).

Additionally, the disclosed techniques address and lessen various latency-inducing effects described above. More specifically, the queue of CPU instructions (as well as the management of this queue by a separate processing thread) is eliminated by matching the timing of the CPU processing (e.g., delaying the start of CPU processing of a frame, as needed) to the GPU processing to eliminate the GPU bottleneck. As a result, the instructions queue between the CPU and GPU will not accumulate, with the queue including only instructions to the GPU to render a single frame. Furthermore, because the frame rendering rate is matched to the display refresh rate, a frame sampling stage may be eliminated. Individual rendered frames are encoded, packetized, and communicated to the client device immediately upon rendering. Additionally, the use of a variable refresh rate may allow the individual frames to be presented on the display immediately as soon as the frames are received via the network connection and decoded. If a new frame is received too quickly, e.g., faster than the inverse refresh rate after a preceding frame, the new frame may be presented together with the preceding frame, resulting in a tear, while nonetheless ensuring low latency.

Unlike other existing techniques of application-to-display synchronization—such as Vertical Synchronization, which prevents frame tears by tying the display refresh to regularly scheduled frame time intervals—the disclosed techniques do not force the received frames to remain in the presentation queue for any amount of time. Instead, the individual frames are presented on the display as soon as they are received (and decoded) by the client device. Even though streaming of some frames may begin before the displaying of an earlier frame has ended, a high frame rate/display refresh rate ensures that the resulting frame tears are, in most instances, rare and imperceptible to the user. The high frame rate (e.g., 240 Hz) causes neighboring frames to have a high degree of similarity as the depicted objects and the environment do not have much time (approximately 4 milliseconds) to evolve between two consecutive frames. This higher-degree of similarity between closely situated frames, in itself, reduces network latency and eliminates the need for the jitter buffer. More specifically, instead of transmitting frames in the raw format, modern codecs encode frames using differences ("deltas") from adjacent (e.g., earlier) frames. The increased frame rate, therefore, reduces the size of the individual frames (as smaller deltas need to be encoded). As a result, increasing the frame rate N-fold leads to much smaller than the N-fold increase in the total volume of the streaming data. For example, increasing the frame rate from 60 Hz to 240 Hz increases the number of frames 4-fold but only increases the total size of the data by 15-20%. As a result, an average 240 Hz frame is about one-third of a size of a 60 Hz frame. This provides significant advantages. In particular, individual 240 Hz frames may be spaced by 4 ms intervals are suitable for single-packet transmission whereas 60 Hz frames use multiple (e.g., three) packets for transmission, which are spaced 16.7/M ms apart, wherein M is a number of packets per frame. If a packet of frame j is lost or corrupted during packetizing or transmission, frame j cannot be displayed, and has to be discarded (unless the display waits for a replacement packet, further increasing latency). Discarding a 60 Hz frame causes a decoder stage to apply the codec delta of the next received frame j+1 to an earlier-received frame, j−1 which (preceding frame j+1 by 33.4 ms) may lead to noticeable distortions in displayed frame j+1. On the other hand, discarding a 240 Hz frame j causes frame j+1 to be decoded using frame j−1 that is only 8.3 ms earlier. As a result, the ensuing distortion of the displayed frame j+1 is significantly smaller and, in many instances, unnoticeable. The small size of a single 240 Hz frame and the low cost of discarding such frames is another reason why the de-jitter buffer may be eliminated from the image rendering pipeline. Even though in the above example, a single packet is used as an illustration, in other embodiments of this disclosure a frame may still be transmitted using two or more packets. Nonetheless, increasing the frame rendering rate (and the display refresh rate) leads to smaller frame sizes and a reduced number of packets per frame whose network transmission is more evenly distributed across time.

The advantages of the disclosed techniques include but are not limited to reduced latency of frame rendering, transmission, and presentation, less frequent occurrences of stutters, and a lowered cost of frame tears and/or lost/corrupted frames. This improves the application's performance and the overall user experience.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

System Architecture

FIG. 1 is a block diagram of an example system capable of reducing latency by optimizing one or more latency-inducing stages of a frame processing pipeline that supports operations of a latency-sensitive application, according to at least one embodiment. As depicted in FIG. 1, system 100 may include multiple computing devices, including a server machine 102 connected via a network 160 to client devices 140A . . . 140N. In one example embodiment, server machine 102 is a server of a cloud gaming service (e.g., gaming-on-demand center or gaming-as-a-service center), e.g., a type of online gaming that runs a game application 110 remotely on one or more server machines 102 and streams game content directly to client devices 140A . . . 140N. Although a reference throughout this disclosure may often be made to game applications, application 110 may be or include any other application which renders and streams data to a device that displays that data, e.g., client devices 140A . . . 140N. Although FIG. 1, for the sake of illustration, depicts client devices 140A . . . 140N that are communicating to server machine 102 via network 160, the techniques and embodiments of the instant disclosure are also applicable to applications 110 that are run on a single, e.g., local, computer that renders images and then displays the rendered images on a local monitor.

Various processes and operations of application 110 may be executed and/or supported by a number of processing resources of server machine 102, including main memory 104, one or more central processing units (CPUs) 106, one or more graphics processing units (GPUs) 108, and/or various other components that are not explicitly illustrated in FIG. 1, such as wireless modems, network cards/controllers, local buses, graphics cards, parallel processing units (PPUs), data processing units (DPUs), accelerators, and so on.

Some or all client devices 140A . . . 140N may include respective input devices 141A . . . 141N and displays 142A . . . 142N. "Input device" may include any device capable of capturing a user input, such as a keyboard, mouse, gaming console, joystick, touchscreen, stylus, camera/microphone (to capture audiovisual inputs), and/or any other device that can detect a user input. The terms "monitor," "display," and "screen," as used herein, should be understood to include any device from which images can be perceived by a user (e.g., gamer), such as an LCD monitor, LED monitor, CRT monitor, plasma monitor, including any monitor communicating with a computing device via an external cable (e.g., HDMI cable, VGA cable, DVI cable, DisplayPort cable, USB cable, and/or the like) or any monitor communicating with a computing device (e.g., an all-in-one computer, a laptop computer, a tablet computer, a smartphone, and/or the like) via an internal cable or bus. "Monitor" should also include any augmented/mixed/virtual reality device (e.g., glasses), wearable device, and/or the like. In some embodiments, any, some, or all displays 142A . . . 142N may be variable refresh range (VRR) displays, which detect frame rate of the video content provided to the display and dynamically adjust the refresh rate of the display.

Application 110 may cause server machine 102 to generate data (e.g., video frames) that is to be displayed on one or more displays 142A . . . 142N. A set of operations that begins with data generation and concludes with displaying the generated data is referred to as the frame rendering pipeline herein. The frame rendering pipeline may include operations performed by server machine 102, e.g., a rendering stage, a capture stage, an encoding stage, a packetizer stage. The image rendering pipeline may also include a transmission stage that involves transmission of packets of data packetized by server machine 102 via network 160 (or any other suitable communication channel). The image rendering pipeline may further include operations performed by a client device 140X, such as operations of a depacketizer stage, a decoding stage, a buffer stage, and a presentation stage. The operations of the image rendering pipeline on client device 140X may be supported by a display agent 150X.

The rendering stage may refer to the stage in the pipeline in which video frames (e.g., the video game output) are rendered on server machine 102 according with a certain frame rate that may be set by a frame rate controller 130, e.g., as disclosed in more detail below. The frame capture stage may refer to the stage in the pipeline in which rendered frames are captured immediately after being rendered. The frame encoding stage may refer to the stage in the pipeline in which captured frames of the video are compressed using any suitable compressed video format, e.g., H.264, H.265, VP8, VP9, AV1, or any other suitable video codec formats. The frame packetizer stage may refer to the stage in the pipeline in which the compressed video format is partitioned into packets for transmission over network 160. The transmission stage may refer to the stage in the pipeline in which packets are transmitted to client device 140X. The frame depacketizer stage may refer to the stage in the pipeline in which the plurality of packets is assembled into the compressed video format on client device 140X. The frame decoding stage may refer to the stage in the pipeline in which the compressed video format is decompressed into the frames. The frame buffer stage may refer to the stage in the pipeline in which the frames are populated (e.g., queued) into a buffer to prepare for display. The presentation stage may refer to the stage in the pipeline in which frames are displayed on display 142X.

Some or all display agents 150A . . . 150N of respective client devices 140A . . . 140N may include a corresponding refresh rate monitoring component 152A . . . 152N that collects various metrics that characterize operations of the image rendering pipeline on the respective client device 140X. The metrics may include: an average refresh rate of display 142X, a noise (jitter) of the refresh rate of display 142X, specific timestamps corresponding to the times when display 142X begins displaying individual frames, the times when display 142X finishes displaying individual frames, and/or various other metrics. Metrics collected by a refresh rate monitoring component 152X on the side of client device 140X may be provided to a latency tracking engine (LTE) 120 on the server machine 102. LTE 120 may further collect various additional metrics on the side of the server machine 102, including but not limited to average and/or per-frame time for CPU processing $T_{CPU}$, average and/or per frame time for GPU rendering $T_{CPU}$, average and/or per-frame time of delivering a frame to display 142X (which may include time for packetizing/depacketizing of individual frames and time spent in network transmission of the packets).

Metrics collected by LTE 120 may track frame processing at one, some, or all the stages of the image processing pipeline and may be used by frame rate controller 130 to pace frame rendering to minimize latency in frame processing along the pipeline, e.g., as disclosed in more detail below.

Figure 2A:
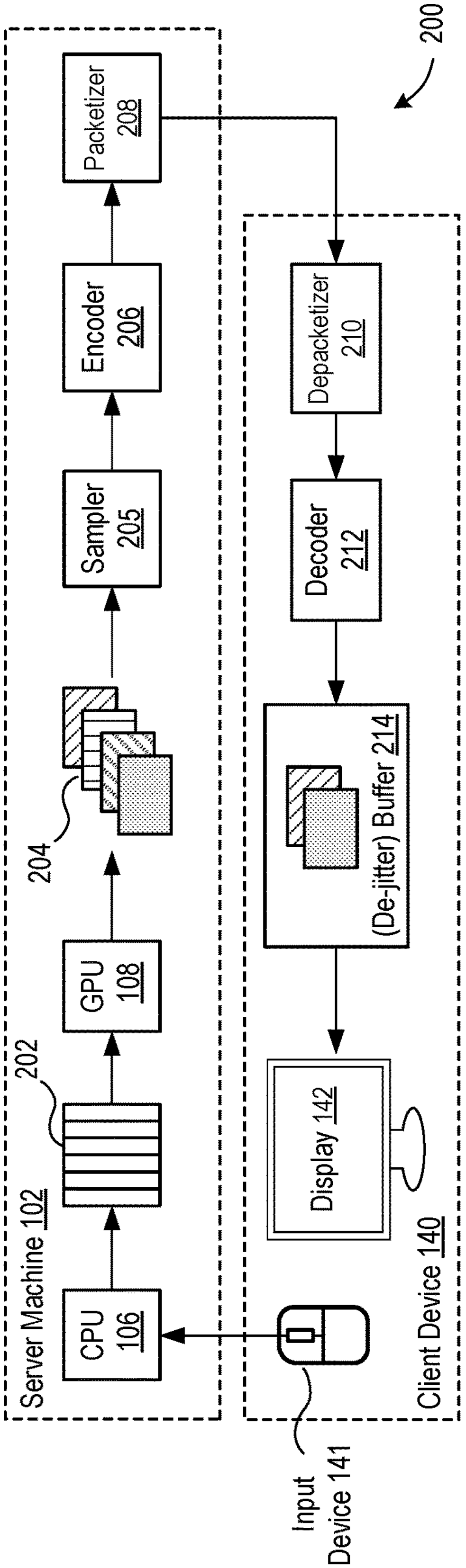
FIGS. 2A-2B illustrate operation of an example image processing pipeline deploying techniques that reduce latency by optimizing one or more latency-inducing stages of a frame processing pipeline, according to at least one embodiment.
Figure 2B:
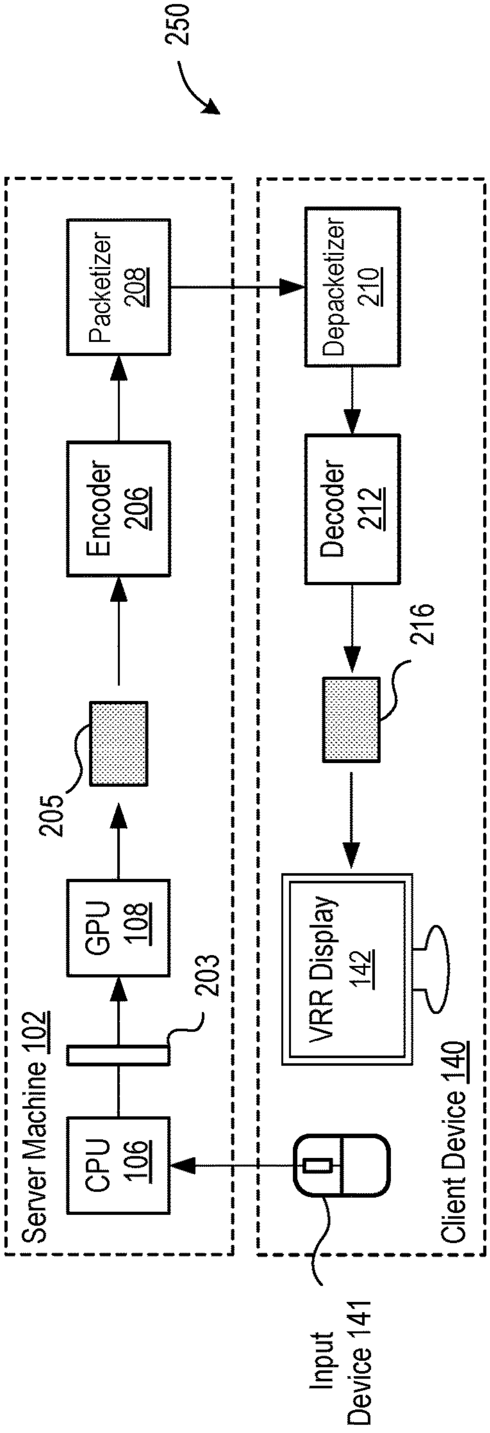

FIGS. 2A-2B illustrate operation of an example image processing pipeline deploying techniques that reduce latency by optimizing one or more latency-inducing stages of a frame processing pipeline, according to at least one embodiment. FIG. 2A illustrates a conventional image processing pipeline 200 and FIG. 2B illustrates an image processing pipeline 250 that implements techniques of the instant disclosure. The image processing pipelines 200 and 250 may support operations of a suitable image-generating application (e.g., application 110 in FIG. 1) on server machine 102. The application (e.g., a gaming application) may use one or more processing units to render video frames. For example, CPU 106 may process user inputs captured by input device 141 of client device 140, update the current state of the application (e.g., game), perform simulations of a new content (images/scenes/context) to be rendered (e.g., in view of specific distances traveled by various game objects, angles to which the objects have turned, and/or like), and generate rendering instructions for GPU 108.

In the conventional image processing pipeline 200, CPU 106 maintains a queue 202 of instructions for GPU 108 to process. CPU 106 manages the queue 202 by keeping track of instructions that take too long to execute, eliminating instructions from the queue 202 related to frames that are no longer relevant, and/or the like. The existence of the queue 202 contributes to latency of the conventional image processing pipeline 200.

GPU 108 executes instructions from the queue 202, renders the scheduled content (e.g., by rasterizing and shading pixels) and places the rendered frames into a frame queue 204. In conventional image processing pipelines, frames can be rendered with a rate that exceeds the rendering rate of display 142. Correspondingly, since not all rendered frames in frame queue 204 can possibly be displayed, a sampler 205 selects frames from frame queue 204 according to a suitable schedule (e.g., every second frame, if the frame rendering rate is twice the frame refresh rate, two out of groups of three frames, if the frame rendering rate is 1.5 times the frame refresh rate, and so on). Operations of sampler 205 requires additional processing, e.g., performed by CPU 106, to support and coordinate frame sampling. This further increases the latency of the pipeline.

The sampled frames are processed by an encoder 206, which encodes individual rendered frames from a video game format to a digital format. Once the frame is rendered by encoder 206, packetizer 208 packetizes the encoded frame for transmission over network (e.g., network 160 of FIG. 1, not explicitly depicted in FIG. 2A and FIG. 2B). Packetizing encoded frames includes partitioning the encoded frames into a plurality of packets (e.g., formatted units of data). Network transmission of packets to client device 140 can cause some of the packets to be lost or delayed (network jitter). The packets received by client device 140 are processed by a depacketizer 210 that depacketizes the encoded frame. Once the encoded frame is assembled from multiple packets, decoder 212 decodes the encoded frame. The decoded frames are then placed in a de-jitter buffer 214. Multiple frames maintained in de-jitter buffer 214 may be used to help smooth out fluctuations in the network throughput. For example, de-jitter buffer 214 may store partially delivered frames while different packets of the frames are being transmitted (or retransmitted, in the instances of lost packets) over the network, and so on. De-jitter buffer 214 may also be used in conventional image processing pipelines (e.g., pipeline 200) to delay presentation of received and decoded frames on display 142 to ensure that in the instances of lost or incompletely received frames, one or more frames are available in de-jitter buffer 214 for presentation. Although the de-jitter buffer 214 helps with smoothing out variability of the network throughput, time delays associated with the use of the buffer introduce additional latency that negatively affects performance of the pipeline and the application whose operations are supported by the pipeline.

Image processing pipeline 250 of FIG. 2B operating according to embodiments of the instant disclosure eliminates one, some, or all of the queue 202 of instructions, the frame queue 204, and/or de-jitter buffer 214. More specifically, the queue 202 of instructions that may accumulate between CPU 106 and GPU 108 in the conventional pipeline 200 is eliminated in the frame processing pipeline 250 by matching the timing of the CPU processing to the rate of GPU processing. For example, CPU 106 may pace (e.g., delay) the starting time at which a set of instructions 203 for rendering frame j is generated until a previous set of instructions for frame j−1 has been received by GPU 108 and is being executed. Correspondingly, in some embodiments, there is at most one set of unexecuted instructions awaiting GPU processing or at most two sets of such instructions, counting also the set of instructions being currently executed (e.g., a set of instructions for rendering frame j−1). As a result, the absence of the queue of CPU instructions, the latency associated with managing this queue is eliminated.

Additionally, because the frame rendering rate in frame rendering pipeline 250 is matched to the display refresh rate, the frame queue 204 may be eliminated. Correspondingly, sampler 205 need not be deployed. Instead, individual rendered frames 207 are immediately encoded by encoder 206, packetized by packetizer 208, and communicated to client device 140 as soon as rendering by GPU 108 is performed.

Encoder 206 processing frames 207 may be a software-implemented encoder or a dedicated hardware-accelerated encoder configured to encode data substantially compliant with one or more data encoding formats or standards, including, without limitation, H.263, H.264 (AVC), H.265 (HEVC), H.266, VVC, EVC, AVC, AV1, VP8, VP9, MPEG4, 3GP, MPEG2, and/or any other video or multimedia standard formats. Encoder 206 may encode rendered frame 207 by converting the frame from a video game format to a digital format (e.g., H.264 format). Packetizer 208 may packetize the encoded frame for transmission over a network (e.g., network 160 in FIG. 1) via a suitable network controller (network card, etc.). Packetizing the encoded frame may include partitioning the encoded frame into a plurality of packets (e.g., formatted units of data) to be carried by the network. In some embodiments, a high frame rendering rate of frames 207 (e.g., 180 Hz, 240 Hz or higher) may ensure that individual frames 207 are small enough to be transmitted via a single packet. The network controller of server machine 102 may transmit the packets via the network to a network controller of client device 140. Due to network jitter, some of the transmitted packets may be lost in transmission or may take longer to be received by the client device 140. In some instances, a newer frame may take a different route (within the network) than an older frame and arrive earlier than the older frame.

Client device 140 may receive the packetized encoded frame via its network controller and process the received packets using depacketizer 210 and decoder 212. In one or more embodiments, decoder 212 may be a software implemented decoder or a dedicated hardware-accelerated decoder decoding data according to the video encryption standard used by encoder 206. Unlike the conventional pipeline 200, where the decoded frames are placed in de-jitter buffer 214, the frame processing pipeline 250 may immediately use the decoded frame 216 to update display 142.

In some embodiments, display 142 may be (or include) a variable refresh rate display capable of updating the screen whenever a new frame is received. In some embodiments, the refresh rate may be set to 240 Hz (or some other rate). In those instances where the display sets the refresh rate that is different from 240 Hz (e.g., between 239 Hz and 241 Hz, such as 239.9 Hz instead of 240.0 Hz), server machine 102 may detect (e.g., using LTE 120) this difference and cause the application to render video frames at the rate sets by the display (e.g., 239.9 Hz). In some embodiments, the refresh rate may have a different value, e.g., may be between 164 Hz and 166 Hz, between 359 Hz and 361 Hz, or within some other suitable range of frequencies.

The use of the variable refresh rate display 142 allows eliminating the de-jitter buffer 214 on the client side of the frame processing pipeline 250. Instead of buffering, individual frames are presented on display 142 immediately upon receiving via the network connection and decoding. If a new frame e.g., frame j is received too early (e.g., before the time $\tau=(\text{Refresh Rate})^{-1}$ since receiving frame j−1 passes), frame j may be presented on display 142 together with the preceding frame j−1, resulting in a frame tear. Nonetheless, such immediate presentation of frame j ensures that latency is low. On the other hand, the high frame rendering rate ensures that differences between consecutive frames are small, so that the resulting tear is not noticeable or barely noticeable, in most instances, and does not reduce the user's enjoyment or experience of the application. If frame j is received late, e.g., after time $\tau$ since receiving frame j−1, frame j−1 may be continued to be displayed (frame stutter). If frame j is received very late, such that frame j+1 arrives prior to arrival of frame j, frame j+1 may be displayed in place of frame j. If frame j subsequently arrives, frame j may be discarded while frame j+1 is displayed until frame j+2 arrives.

Figure 3:
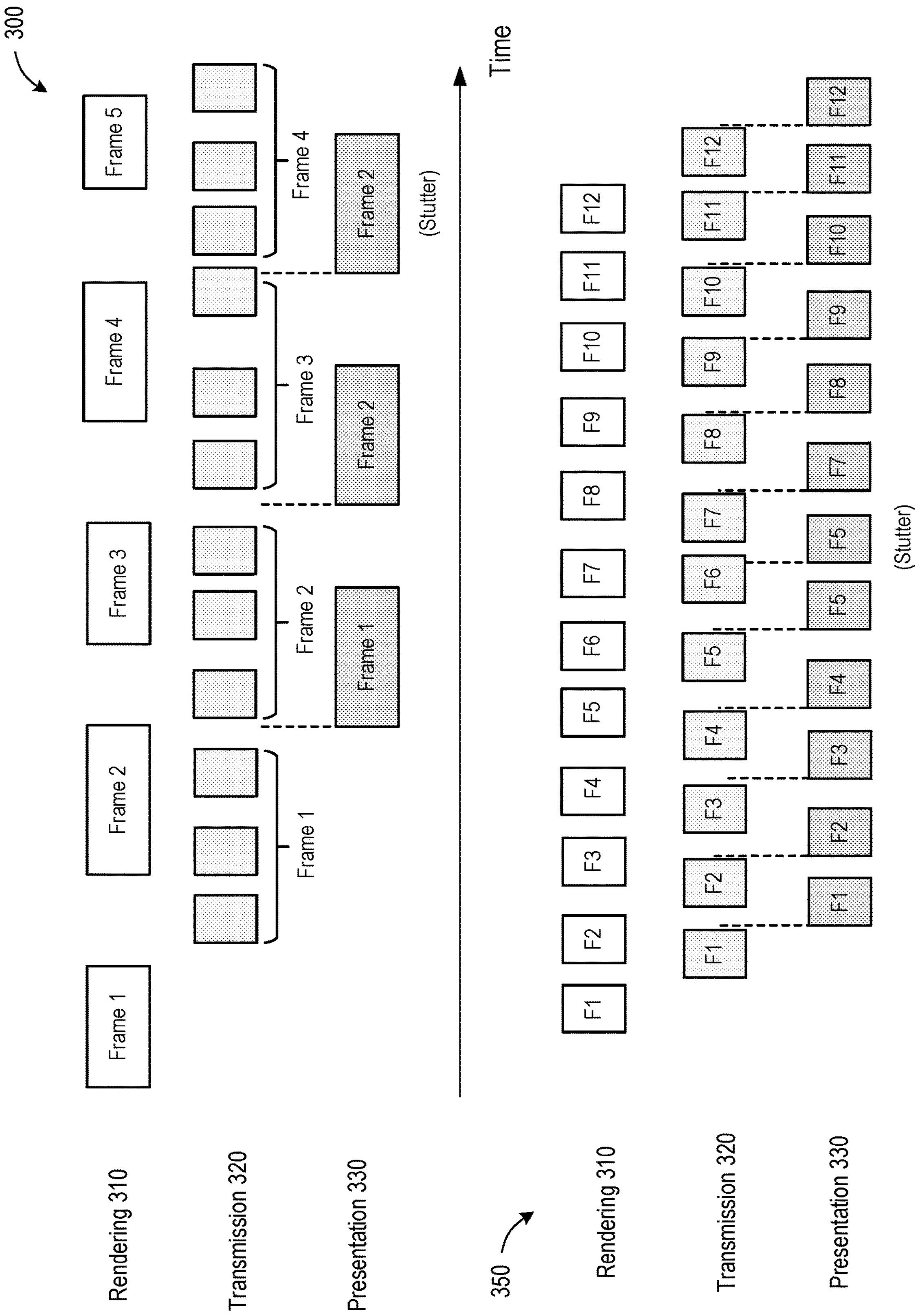
FIG. 3 illustrates a timing diagram of frame processing in a pipeline deploying the techniques that reduce latency by optimizing one or more latency-inducing stages, according to at least one embodiment.

FIG. 3 illustrates a timing diagram of frame processing in a pipeline deploying the techniques that reduce latency by optimizing one or more latency-inducing stages, according to at least one embodiment. Timing diagram 300 depicts frame processing operations of a conventional image processing pipeline (e.g., pipeline 200 of FIG. 2). Operations include frame rendering 310 (e.g., at 60 fps rate), which may be performed by a GPU (e.g., GPU 108 in FIG. 1 and FIG. 2) responsive to CPU instructions and may also include frame encoding and packetizing. Operations may further include network transmission 320, which may be performed using network controllers of the server machine and the client device (and may also include depacketizing and decoding). Operations may further include presentation 330 of the received and decoded frames. These processing operations are depicted in FIG. 3 with rectangles whose horizontal extent illustrates schematically the duration of the respective operations.

As illustrated with the timing diagram 300, time for rendering 310 of individual frames may vary from frame to frame, e.g., rendering Frame 2 or Frame 4 takes longer than rendering Frame 1, Frame 3, or Frame 5. Transmission 320 includes packetizing individual frames into multiple packets (three packets, in FIG. 3), which are reassembled into complete frames upon arrival of all packets of a given frame. Different packets may arrive with uneven cadence. Frames with all packets arrived (and decoded) prior to a scheduled time for presentation of the respective frame (indicated with vertical dashed lines) are provided to the display for presentation 330. In particular, all packets of Frame 1 and Frame 2 are received in time for presentation of the corresponding frames. In contrast, the last packet of Frame 3 is received after the scheduled time for presentation of Frame 2. As a result, the display continues the presentation of Frame 2 for an extra period of time (frame stutter).

As illustrated in the timing diagram 350, individual frames, denoted via F1 . . . F12, are rendered with a high frame rate/display refresh rate, transmitted, and presented on the (variable refresh rate) display as soon as they are received (and decoded) by the client device. The high refresh rate (e.g., 240 Hz) causes neighboring frames to have a high degree of similarity and, correspondingly, reduces the size of the individual frames, which encode smaller differences from preceding frames, e.g., occurring over approximately 4 millisecond spacing between adjusting frames. As a result, increasing the frame rate, from 60 fps to 240 fps (and display refresh rate from 60 Hz to 240 Hz) increases the number of frames 4-fold but increases the total size of the data only by 15-20%. This makes a size of an average 240 Hz frame about one-third of a size of a 60 Hz frame. As illustrated in the timing diagram 350, individual 240 Hz frames spaced by 4 ms intervals may be transmitted via single packets.

Single-packet frames arriving (and being decoded) prior to a scheduled time for presentation of the respective frame (indicated with vertical dashed lines) are provided to a display for presentation 330. In particular, frames F1-F5 are timely received for presentation on the display. Frame F6 is received after the scheduled time for presentation. As a result, the display continues the presentation of frame F5 for an extra period of time. As illustrated, during the stutter of frame F5, both frames F6 and F7 may arrive, in which case the older frame F6 may be discarded and frame F7 may be displayed. Since frames F7 and F5 are merely spaced 8.3 ms apart, displaying frame F7 after frame F6 does not cause, in most instances, perceptible visual artifacts.

Figure 4:
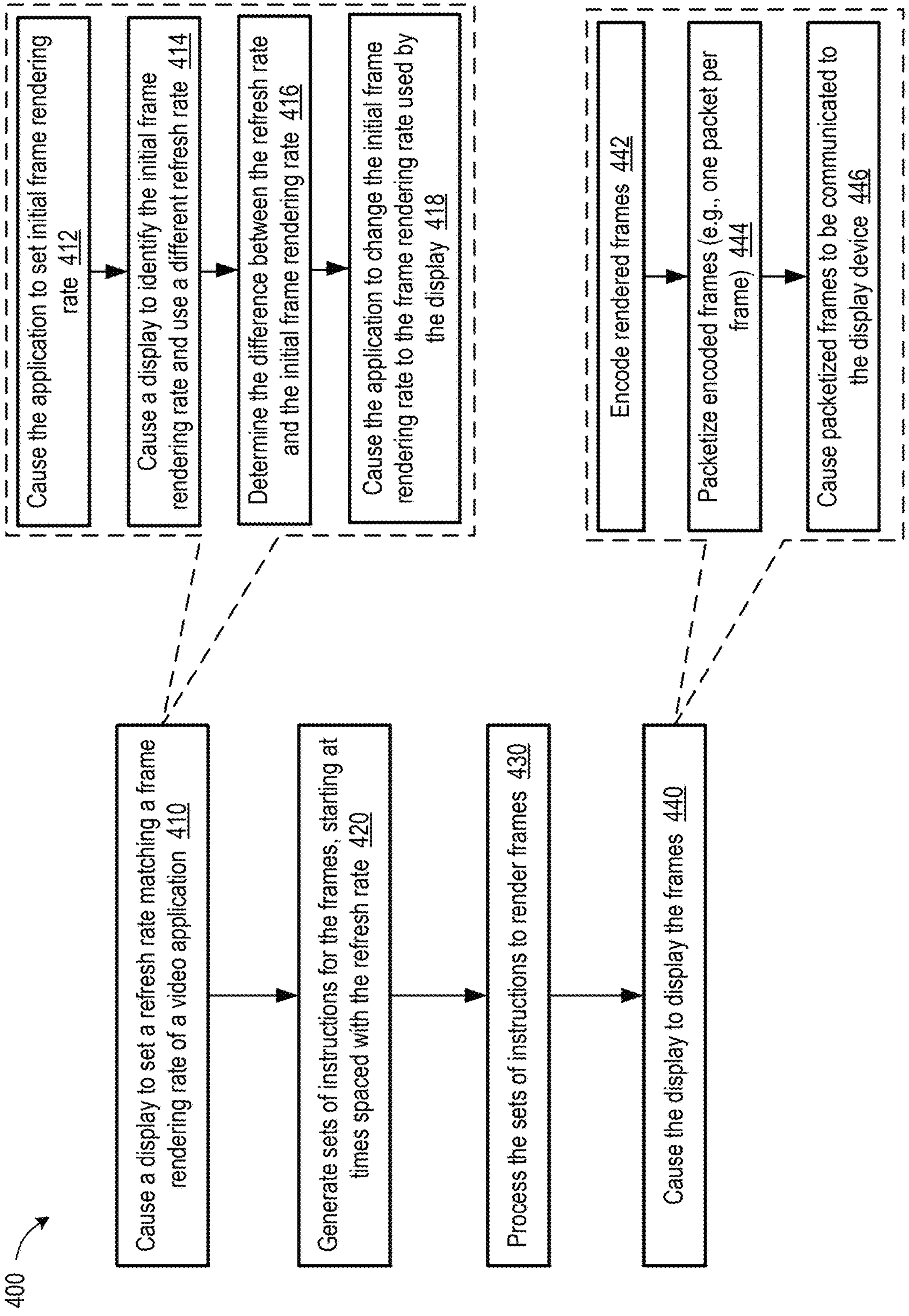
FIG. 4 is a flow diagram of an example method of latency-reducing operations of a server portion of a frame processing pipeline, according to at least one embodiment.
Figure 5:
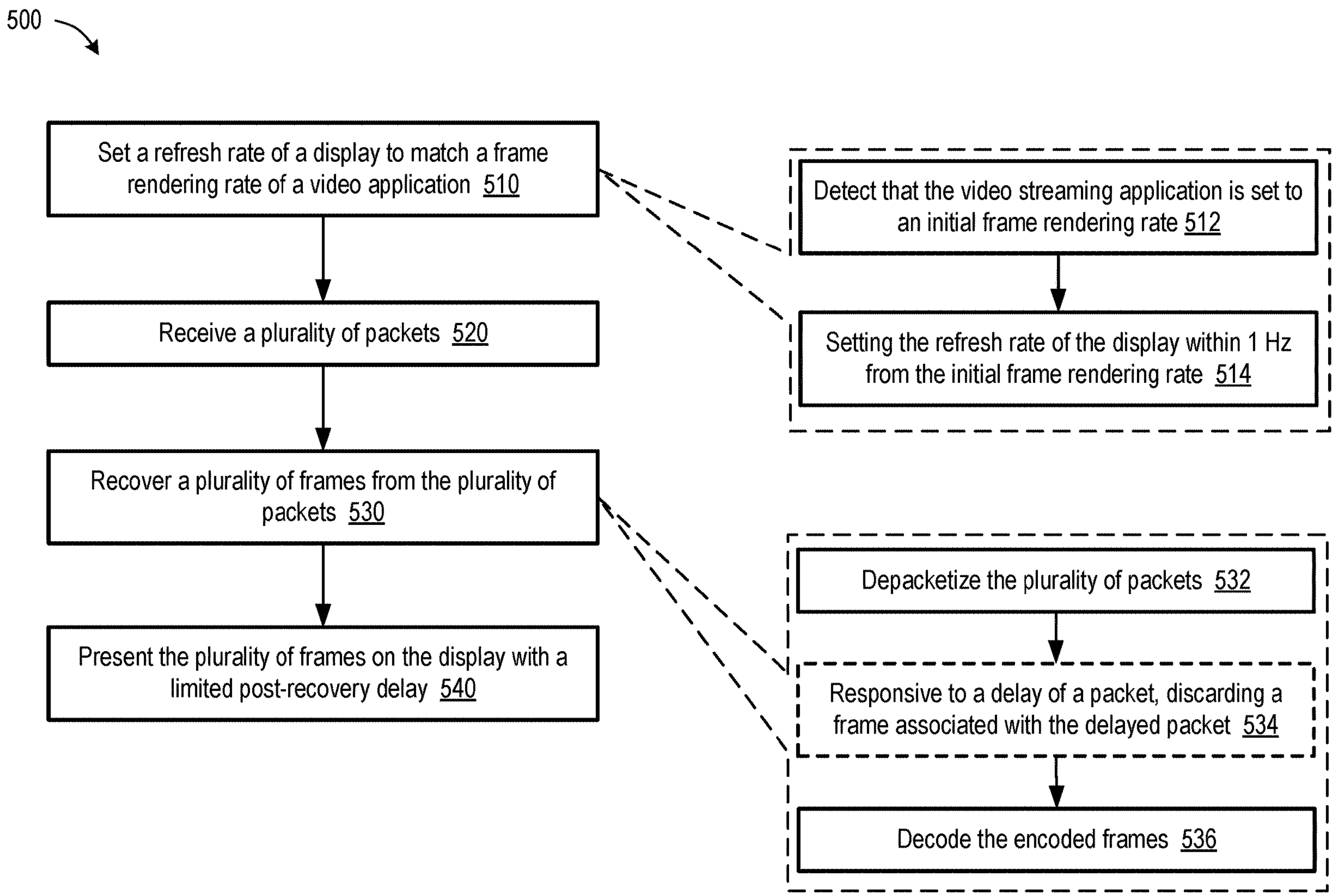
FIG. 5 is a flow diagram of an example method of latency-reducing operations of a client device portion of a frame processing pipeline, according to at least one embodiment.

FIG. 4 and FIG. 5 illustrate example methods 400 and 500 of deploying a frame processing pipeline that eliminates or reduces latency by optimizing one or more latency-inducing stages of frame generation and processing. Methods 400 and/or 500 may be performed in the context of any suitable video applications, including local applications and cloud-based applications, such as gaming applications, video streaming applications, autonomous driving applications, surveillance applications, manufacturing control applications, retail control applications, virtual reality or augmented reality services, chatbot applications, and many other contexts, as well as systems and applications for providing one or more of such services. Methods 400 and/or 500 may be performed using one or more processing units (e.g., CPUs, GPUs, accelerators, PPUs, DPUs, etc.), which may include (or communicate with) one or more memory devices. In at least one embodiment, methods 400 and/or 500 may be performed using various components and devices illustrated in FIG. 1, e.g., server machine 102, one or more client devices 140A . . . 140N, and/or the like. In at least one embodiment, processing units performing methods 400 and/or 500 may be executing instructions stored on a non-transient computer-readable storage media. In at least one embodiment, methods 400 and/or 500 may be performed using multiple processing threads (e.g., CPU threads and/or GPU threads), individual threads executing one or more individual functions, routines, subroutines, or operations of the method. In at least one embodiment, processing threads implementing methods 400 and/or 500 may be synchronized (e.g., using semaphores, critical sections, and/or other thread synchronization mechanisms). Alternatively, processing threads implementing methods 400 and/or 500 may be executed asynchronously with respect to each other. Various operations of methods 400 and/or 500 may be performed in a different order compared with the order shown in FIG. 4 and/or FIG. 5. Some operations of methods 400 and/or 500 may be performed concurrently with other operations. In at least one embodiment, one or more operations shown in FIG. 4 and/or FIG. 5 may not always be performed.

FIG. 4 is a flow diagram of an example method 400 of latency-reducing operations of a server portion of a frame processing pipeline, according to at least one embodiment. Operations of method 400 may be performed by processing units of server machine 102, e.g., CPU 106 and GPU 108, which may execute commands of application 110, e.g., a video application. In some embodiments, the video application may be, or include, a gaming application. At block 410, method 400 may include causing a display device to set a refresh rate that matches a frame rendering rate of the video application. The display device can be a display 142 of client device 140 (as shown in FIG. 2) communicating with server machine 102 over a network (e.g., network 160 in FIG. 1). In some embodiments, the display can be connected to the server machine (e.g., a personal computer) via a local cable, bus, or interconnect. In some embodiments, the display device may be, or include, a variable refresh rate display.

In some embodiments, causing the display device to set the refresh rate that matches the frame rendering rate of the video application may include operations illustrated by the top callout portion of FIG. 4. More specifically, at block 412, method 400 may include causing the video application to set an initial frame rendering rate. The initial frame rendering rate may be a default rate that the video application is set to use, e.g., 240 frames per second. At block 414, method 400 may continue with causing the display device to identify the initial frame rendering rate. For example, the video application may begin rendering frames at the frame rendering rate set by the video application (e.g., 240 fps) and communicate the rendered frames to the display device. The display device may use, responsive to the identified initial frame rendering rate, a refresh rate that does not fully match the initial frame rendering rate (e.g., 239.9 Hz). At block 416, the server machine may determine a difference between the refresh rate used by the display device (e.g., 239.9 Hz) and the initial frame rendering rate (e.g., 240 fps). For example, the server machine 102 can receive, via the latency tracking engine 120, timestamp data associated with presentation of various frame on the display device and determine the difference between the refresh rate used by the display device and the initial frame rendering rate. At block 418, method 400 may continue with causing the video application to transition from the initial frame rendering rate (e.g., 240 fps) to the frame rendering rate that matches the refresh rate used by the display device (e.g., 239.9 fps).

As a result of the operations of blocks 410-418, the refresh rate of the display device may be set at any suitable value, e.g., between 239 Hz and 241 Hz, between 164 Hz and 166 Hz, or between 359 Hz and 361 Hz, or within any other range preferred by the video application.

Method 400 may continue with rendering, with the frame rendering rate, a plurality of frames. In some embodiments, rendering the plurality of frames may include operations 420-440. In particular, operation 420 may include generating, using a first processing unit, a plurality of sets of instructions. Individual sets of instructions may be associated with respective frames of the plurality of frames and may be generated starting at times spaced with the refresh rate. For example, if the refresh rate is 240 Hz, the sets of instructions may be spaced 4.2 (1/240) ms apart. In some embodiments, the first processing unit may be, or include, a CPU (e.g., CPU 106). In some embodiments, At block 430, method 400 may include processing, using a second processing unit, the plurality of sets of instructions to render the plurality of frames. In some embodiments, the first processing unit may be, or include, a GPU (e.g., GPU 108). In some embodiments, a queue of unexecuted instructions of the plurality of instructions may include sets of instructions for rendering two or fewer frames of the plurality of frames (e.g., a set of instructions for a currently rendered frame and a set of instructions for the next frame to be rendered).

At block 440, method 400 may include causing the display device to display the plurality of frames. In some embodiments, causing the display device to display the plurality of frames may include operations illustrated with the bottom callout portion of FIG. 4. More specifically, at block 442, method 400 may include encoding, using a video codec (e.g., encoder 206), each frame of the plurality of frames. At block 444, method 400 may continue with packetizing each encoded frame of the plurality of frames (e.g., using packetizer 208) into a plurality of packets. In some embodiments, individual packets of the plurality of packets may include a suitable representation of a single frame (e.g., a single frame encoded by encoder 206). At block 446, method 400 may continue with causing each packetized frame of the plurality of frames to be communicated to the display device (to be rendered on the display device 142 of client device 140).

FIG. 5 is a flow diagram of an example method 500 of latency-reducing operations of a client device portion of a frame processing pipeline, according to at least one embodiment. Operations of method 400 may be performed by various components of client device 140, including processing logic, display 142, depacketizer 210, decoder 212 (as illustrated in FIG. 2B). In some embodiments, the display of the client device may be displaying frames generated and rendered using an application (e.g., a video application, such as a gaming application) on server machine 102, as disclosed above in conjunction with method 400. In some embodiments, the display device may be, or include, a variable refresh rate display. Method 500 may be performed together with method 400, in some embodiments. At block 510, method 500 may include setting a refresh rate of the display device to match a frame rendering rate of the video application.

In some embodiments, setting the refresh rate of the display device to match the frame rendering rate of the video application may include operations illustrated with the top callout portion of FIG. 5. More specifically, at block 512, method 500 may include detecting that the video streaming application is set to an initial frame rendering rate, e.g., based on an initial set of rendered and transmitted frames, a direct instruction from the application, or in some other suitable manner. At block 514, method 500 may include setting the refresh rate of the display device to be within 1 Hz from the initial frame rendering rate.

At block 520, method 500 may include receiving a plurality of packets (e.g., frames rendered, encoded, and packetized by server machine 102. At block 530 method 500 may include recovering, using the plurality of packets, a plurality of frames rendered by the video application. In some embodiments, individual packets of the plurality of packets may include an encoded representation of a single frame of the plurality of frames.

In some embodiments, recovering the plurality of frames may include operations illustrated in the bottom callout portion of FIG. 5. In particular, at block 532, method 500 may include depacketizing the plurality of packets to obtain a plurality of encoded frames. with decoding the plurality of encoded frames to recover the plurality of frames. In some embodiments, as indicated with block 534, method 500 may include determining that a given packet of the plurality of packets has not been received within a time interval of 1.5 of an inverse refresh rate $\tau$, (or some other time, e.g., 1.2 $\tau$, 1.3 $\tau$, 1.7 $\tau$) from receiving a preceding packet of the plurality of packets. Responsive to such a determination, the client device (e.g., a processing logic implementing commands from a driver of the display), may discard a frame associated with the given packet. In such instances, a previously displayed frame may still be presented.

At block 536, method 500 may include decoding the plurality of encoded frames to recover the plurality of frames. At block 540, method 500 may continue presenting the plurality of frames on the display device. Presentation of an individual frame of the plurality of frames may occur (e.g., commence so that the first pixels/lines of the frame are streamed to the display) immediately after the corresponding frame is decoded. In some embodiments, the delay—e.g., the time between frame decoding and the moment the first pixels/lines of the frame are streamed to the display may be less than 0.5 $\tau$, e.g., one half of an inverse refresh rate $\tau$, less than 0.3 $\tau$, less than 1.0 $\tau$, and/or the like.

Figure 6:
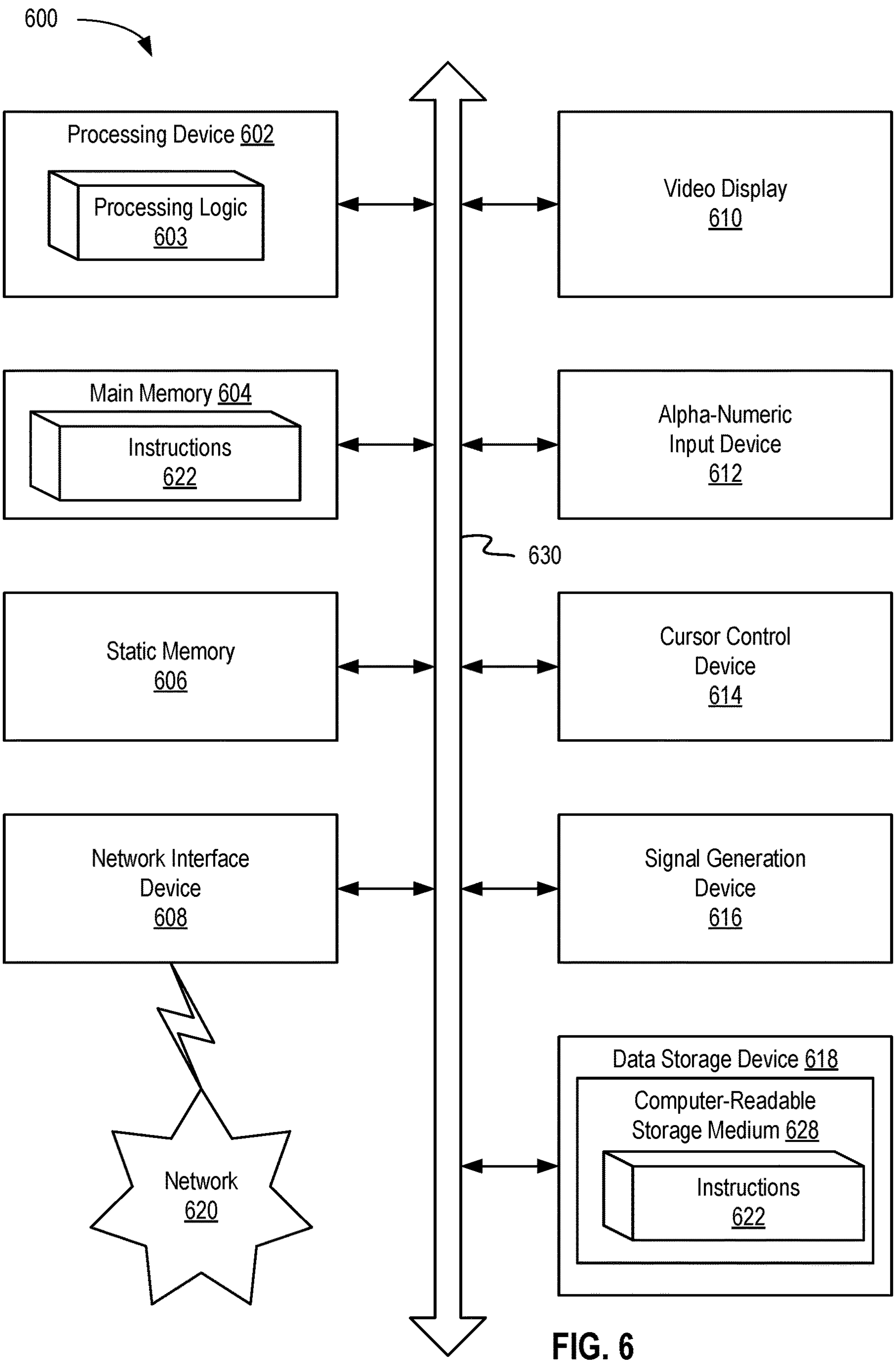
FIG. 6 depicts a block diagram of an example computer device capable of implementing reduced-latency frame processing pipelines for latency-sensitive application, according to at least one embodiment.

FIG. 6 depicts a block diagram of an example computer device 600 capable of implementing reduced-latency frame processing pipelines for latency-sensitive application, according to at least one embodiment. Example computer device 600 can be connected to other computer devices in a LAN, an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 can be configured to execute instructions executing methods 400 and 500 of deploying a frame processing pipeline that eliminates or reduces latency by optimizing one or more latency-inducing stages of frame generation and processing.

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions executing methods 400 and 500 of deploying a frame processing pipeline that eliminates or reduces latency by optimizing one or more latency-inducing stages of frame generation and processing.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In the present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

rendering a plurality of frames at a frame rendering rate corresponding to a video application, the frame rendering rate matching a refresh rate of a display device, wherein rendering the plurality of frames comprises:

generating, using a first processing unit, a plurality of sets of instructions for a second processing unit, wherein individual sets of instructions of the plurality of sets of instructions are associated with rendering, using the second processing unit, of respective frames of the plurality of frames and are generated at times spaced with the refresh rate, wherein the first processing unit generates the plurality of sets of instructions at a rate determined to maintain a queue of unexecuted, by the second processing unit, instructions that comprises one or more sets of instructions for rendering two or fewer frames of the plurality of frames;

processing, using the second processing unit, the plurality of sets of instructions to render the plurality of frames; and causing the display device to display the plurality of frames.

2. The method of claim 1, wherein the display device comprises a variable refresh rate display.

3. The method of claim 1, wherein the frame rendering rate of the video application is set by:

rendering an initial plurality of frames at an initial frame rendering rate to cause the display device to (i) identify the initial frame rendering rate and (ii) set, responsive to the identified initial frame rendering rate, the refresh rate;

determining a difference between the refresh rate used by the display device and the initial frame rendering rate; and causing the video application to transition from the initial frame rendering rate to the frame rendering rate.

4. The method of claim 1, wherein the first processing unit comprises a central processing unit (CPU), and wherein the second processing unit comprises a graphics processing unit (GPU).

5. The method of claim 1, wherein the refresh rate is between 239 Hz and 241 Hz, between 164 Hz and 166 Hz, or between 359 Hz and 361 Hz.

6. The method of claim 1, wherein causing the display device to display the plurality of frames comprises:

encoding, based at least on a video codec, at least one frame of the plurality of frames.

7. The method of claim 6, wherein causing the display device to display the plurality of frames further comprises:

packetizing at least one encoded frame of the plurality of frames; and causing at least one packetized frame of the plurality of frames to be communicated to the display device.

8. The method of claim 1, wherein causing the display device to display the plurality of frames comprises:

generating a plurality of packets wherein one or more individual packets of the plurality of packets comprise a representation of a single frame of the plurality of frames.

9. The method of claim 1, wherein the video application comprises at least one of a gaming application, a content streaming application, or a collaborative content creation application.

10. A method comprising:

determining a frame rendering rate associated with an initial plurality of frames rendered by a video application;

setting a refresh rate of a display device to match the frame rendering rate;

rendering an initial plurality of frames on the display device;

communicating, to the video application, timing metrics associated with the rendered initial plurality of frames;

receiving a plurality of frames rendered by the video application with an adjusted, based on the timing metrics, rendering rate;

responsive to receiving a first frame of the plurality of frames prior to a first scheduled time for displaying the first frame, presenting the first frame on the display device concurrently with displaying a preceding frame of the plurality of frames; and responsive to receiving a second frame of the plurality of frames with a predetermined delay after a second scheduled time for displaying the second frame, discarding the second frame, wherein the predetermined delay is between 1.2 and 1.7 of a spacing between frames that corresponds to an inverse of the refresh rate.

11. The method of claim 10, wherein the display device comprises a variable refresh rate display.

12. The method of claim 10, wherein the refresh rate of the display device is set to be within 1 Hz from the determined frame rendering rate associated with the initial plurality of frames.

13. The method of claim 10, wherein the refresh rate is between 239 Hz and 241 Hz, between 164 Hz and 166 Hz, or between 359 Hz and 361 Hz.

14. The method of claim 10, wherein receiving the plurality of frames comprises:

receiving a plurality of packets;

depacketizing the plurality of packets to obtain a plurality of encoded frames; and decoding the plurality of encoded frames to recover the plurality of frames.

15. The method of claim 14, wherein one or more individual packets of the plurality of packets comprise an encoded representation of a single frame of the plurality of frames.

16. A system comprising:

a plurality of processing units to:

render, a plurality of frames at a frame rendering rate of an application, the frame rendering rate matching a refresh rate of a display device, wherein to render the plurality of frames, the plurality of processing units are to:

generate, using a first processing unit of the plurality of processing units, a plurality of sets of instructions for a second processing unit of the plurality of processing units, wherein individual sets of instructions of the plurality of sets of instructions are associated with rendering, using the second processing unit, of respective frames of the plurality of frames and are generated starting at times spaced with the refresh rate, wherein the first processing unit is to generate the plurality of sets of instructions at a rate determined to maintain a queue of unexecuted, by the second processing unit, instructions that comprises one or more sets of instructions for rendering two or fewer frames of the plurality of frames;

process, using the second processing unit, the plurality of sets of instructions to render the plurality of frames; and cause the display device to display the plurality of frames.

17. The system of claim 16, wherein the display device comprises a variable refresh rate display.

18. The system of claim 16, wherein the frame rendering rate of the application is set by:

rendering an initial plurality of frames at an initial frame rendering rate to cause the display device to (i) identify the initial frame rendering rate and (ii), responsive to the identified initial frame rendering rate, the refresh rate;

determining a difference between the refresh rate used by the display device and the initial frame rendering rate; and causing the application to transition from the initial frame rendering rate to the frame rendering rate.

19. The system of claim 16, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational AI operations;

a system for generating synthetic data using AI operations;

a system incorporating one or more virtual machines (VMs);

a system implemented at least partially in a data center; or a system implemented at least partially using cloud computing resources.

* * * * *